US009309609B2

(12) United States Patent
Booth et al.

(10) Patent No.: US 9,309,609 B2
(45) Date of Patent: *Apr. 12, 2016

(54) RECYCLED POLYETHYLENE TEREPHTHALATE COMPOSITIONS, FIBERS AND ARTICLES PRODUCED THEREFROM, AND METHODS FOR PRODUCING SAME

(71) Applicant: Columbia Insurance Company, Omaha, NE (US)

(72) Inventors: Hubert J. Booth, Dalton, GA (US); Christopher Eric Bradley, Evans, GA (US); Daniel Ray Johnson, Edisto Beach, SC (US); James Henry Keen, Jr., Dalton, GA (US)

(73) Assignee: Columbia Insurance Company, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/285,143

(22) Filed: May 22, 2014

(65) Prior Publication Data

US 2015/0112030 A1    Apr. 23, 2015

Related U.S. Application Data

(63) Continuation of application No. 12/570,773, filed on Sep. 30, 2009, now Pat. No. 8,735,457.

(60) Provisional application No. 61/101,663, filed on Sep. 30, 2008.

(51) Int. Cl.
| | | |
|---|---|---|
| *D01F 8/14* | (2006.01) | |
| *C08J 11/04* | (2006.01) | |
| *C08L 67/02* | (2006.01) | |
| *D01D 1/06* | (2006.01) | |
| *D01F 6/62* | (2006.01) | |
| *D01F 6/92* | (2006.01) | |

(52) U.S. Cl.
CPC . *D01F 8/14* (2013.01); *C08J 11/04* (2013.01); *C08L 67/02* (2013.01); *D01D 1/065* (2013.01); *D01F 6/62* (2013.01); *D01F 6/92* (2013.01); *C08J 2367/02* (2013.01); *Y02W 30/70* (2015.05); *Y10T 428/1362* (2015.01); *Y10T 428/1366* (2015.01); *Y10T 428/1369* (2015.01)

(58) Field of Classification Search
CPC ..... C08L 67/02; C08L 2666/18; D01D 1/065; D01F 6/02; D01F 6/62; D01F 6/92; D01F 8/14; Y10T 428/1369; Y10T 428/1366; Y10T 428/1362; C08J 2367/02; C08J 11/04; Y02W 30/70
USPC ........... 521/40, 40.5, 41, 48; 264/37.1, 37.26, 264/176.1; 525/191; 428/36.1–36.3
See application file for complete search history.

(56) References Cited

U.S. PATENT DOCUMENTS

| | | | |
|---|---|---|---|
| 4,138,374 A | | 2/1979 | Currie |
| 5,143,308 A | * | 9/1992 | Hally et al. ..................... 241/76 |
| 5,281,476 A | | 1/1994 | Koyonagi et al. |
| 5,283,295 A | | 2/1994 | Light et al. |
| 5,549,957 A | * | 8/1996 | Negola et al. .................. 428/92 |
| 5,551,755 A | | 9/1996 | Lindberg |
| 6,509,537 B1 | | 1/2003 | Krieg et al. |
| 8,735,457 B2 | | 5/2014 | Booth et al. |
| 8,741,972 B2 | | 6/2014 | Booth et al. |
| 2004/0053047 A1 | | 3/2004 | Jackson et al. |
| 2010/0152309 A1 | | 6/2010 | Booth et al. |
| 2010/0152311 A1 | | 6/2010 | Booth et al. |

FOREIGN PATENT DOCUMENTS

CA        1258958 A1    9/1989

OTHER PUBLICATIONS

Association of Postconsumer Plastic Recyclers. "The Association of Postconsumer Plastic Recyclers Design for Recyclability Program." (2010), pp. 1-28.
Davis-Standard Catalog. "Screw and Barrel Capabilities." (2007), pp. 1-6.
Gneuss. "RSFgenius Series: Fully automatic, pressure-constant, permanent process consistency." http://www.gneuss.de/index.php?lang=en&m=2&produkt=rsfgenius (2008), pp. 1-2.
Hurd Dj. "Best Practices and Industry Standards in PET Plastic Recycling" for Washington State Department of Community, Trade and Economic Development's Clean Washington Center. (1997), pp. 1-55.
Occupational Safety and Health Administration, "OSHA Handbook for Small Businesses," OSHA—U.S. Department of Labor, Washington, D.C., 1996.
Pawlak, A. et al., "Characterization of scrap poly (ethylene terephthalate)," European Polymer Journal, 36 (2000), pp. 1875-1884.
Non-Final Office Action issued on Sep. 9, 2013 for U.S. Appl. No. 12/570,773, filed Sep. 30, 2009 (pp. 1-19).
Final Office Action issued on Jul. 19, 2012 for U.S. Appl. No. 12/570,773, filed Sep. 30, 2009 (pp. 1-16).
Non-Final Office Action issued Jan. 3, 2012 by the United States Patent and Trademark Office for U.S. Appl. No. 12/570,773, filed Sep. 30, 2009 (pp. 1-9).
Restriction Requirement mailed by the U.S. Patent and Trademark Office on Oct. 24, 2011 for U.S. Appl. No. 12/570,773, filed Sep. 30, 2009.

(Continued)

*Primary Examiner* — Frances Tischler
(74) *Attorney, Agent, or Firm* — Ballard Spahr LLP

(57) ABSTRACT

In one aspect, the invention relates to recycled polyethylene terephthalate compositions, fibers and articles produced therefrom, and methods for producing same. In a further aspect, the invention relates to homogenized post-consumer polyethylene terephthalate. In a further aspect, the invention relates to extruded polymer compositions, polymer mixtures, fibers, and/or Bulked Continuous Filament fibers comprising post-consumer polyethylene terephthalate. In a further aspect, the invention relates to processes for preparing recycled polyethylene terephthalate compositions. This abstract is intended as a scanning tool for purposes of searching in the particular art and is not intended to be limiting of the present invention.

20 Claims, 2 Drawing Sheets

(56) References Cited

OTHER PUBLICATIONS

Non-Final Office Action issued on Sep. 10, 2013 for U.S. Appl. No. 12/570,784, filed Sep. 30, 2009 (pp. 1-24).
Final Office Action issued Jul. 18, 2012 by United States Patent and Trademark Office for U.S. Appl. No. 12/570,784, filed Sep. 30, 2009 (pp. 1-21).
Non-Final Office Action issued Jan. 4, 2012 by the United States Patent and Trademark Office for U.S. Appl. No. 12/570,784, filed Sep. 30, 2009 (pp. 1-11).
Restriction Requirement mailed by the U.S. Patent and Trademark Office on Oct. 24, 2011 for U.S. Appl. No. 12/570,784, filed Sep. 30, 2009.
Notice of Allowance/Examiner initiated interview issued on Mar. 26, 2014 for U.S. Appl. No. 12/570,784, filed Sep. 30, 2009 (pp. 1-13).
Response to Non-Final Office Action filed on Mar. 10, 2014 for U.S. Appl. No. 12/570,784, filed Sep. 30, 2009 (pp. 1-18).
RCE/Response to Final Office Action filed on Aug. 19, 2013 for U.S. Appl. No. 12/570,784, filed Sep. 30, 2009 (pp. 1-21).
Response to Non-Final Office Action filed on Jul. 5, 2012 for U.S. Appl. No. 12/570,784, filed Sep. 30, 2009 (pp. 1-18).
Issue Notification issued on May 14, 2014 for for U.S. Appl. No. 12/570,784, filed Sep. 30, 2009 (pp. 1).
Issue Notification issued on May 7, 2014 for U.S. Appl. No. 12/570,773, filed Sep. 30, 2009 (pp. 1).
Notice of Allowance/Examiner initiated Interview issued on Mar. 31, 2014 for U.S. Appl. No. 12/570,773, filed Sep. 30, 2009 (pp. 1-12).
Response to Non-Final Office Action filed on Mar. 10, 2014 for U.S. Appl. No. 12/570,773, filed Sep. 30, 2009 (pp. 1-23).
RCE/Response to Final Office Action filed on Aug. 22, 2013 for U.S. Appl. No. 12/570,773, filed Sep. 30, 2009 (pp. 1-16).
Response to Non-Final Office Action filed on Jul. 3, 2012 for U.S. Appl. No. 12/570,773, filed Sep. 30, 2009 (pp. 1-13).
Non-Final Office Action issued on May 29, 2014 for U.S. Appl. No. 13/792,578, filed Mar. 11, 2013 (pp. 1-11).
Response to Non-Final Office Action filed on Dec. 1, 2014 for U.S. Appl. No. 13/792,571, filed Mar. 11, 2013 (pp. 1-12).
Final Office Action issued Dec. 24, 2014 for U.S. Appl. No. 13/792,571, filed Mar. 11, 2013 and published as US 2014-0213673 A1 on Jul. 31, 2014 (pp. 1-9).
Final Office Action issued Dec. 26, 2014 for U.S. Appl. No. 13/792,578, filed Mar. 11, 2013 and published as US 2014-0213740 A1 on Jul. 31, 2014 (pp. 1-10).
Response to Non-Final Office Action filed on Dec. 1, 2014 for U.S. Appl. No. 13/792,578, filed Mar. 11, 2013 (pp. 1-13).
Non-Final Office Action issued Feb. 13, 2014 for U.S. Appl. No. 14/285,174, filed May 22, 2015 and published as US 2015-0110994 A1 on Apr. 23, 2015 (pp. 1-13).
Final Office Action issued by the United States Patent & Trademark Office on Sep. 1, 2015 for U.S. Appl. No. 14/285,174, filed May 22, 2014 and published as US 2015-0110994 A1 on Apr. 23, 2015 (10 pages).

\* cited by examiner

RECYCLED POLYETHYLENE TEREPHTHALATE COMPOSITIONS, FIBERS AND ARTICLES PRODUCED THEREFROM, AND METHODS FOR PRODUCING SAME

CROSS-REFERENCE TO RELATED APPLICATIONS

This application is a continuation of and claims the benefit of priority to co-pending U.S. patent application Ser. No. 12/570,773 filed Sep. 30, 2009, which claims the benefit of priority to U.S. Provisional Application No. 61/101,663, filed on Sep. 20, 2008. The aforementioned applications are hereby incorporated herein by reference in their entireties.

BACKGROUND

Polyethylene terephthalate (PET) resins exhibit toughness, clarity, good barrier properties, lightweight, design flexibility, chemical resistance, and good shelf-life performance. Consequently, PET is widely used in the packaging industry, for example, in manufacturing of beverage bottles. Further, PET is environmentally friendly, since it can be recycled.

Conventional recycling processes for post-consumer PET (PCPET), however, typically fail to provide materials satisfactory for extrusion into fiber, for example, bulked continuous filament (BCF), especially compared to virgin PET (VPET). For example, recycled polyethylene terephthalate (RPET) provided by conventional recycling techniques can exhibit unsatisfactory streaking when used in carpet applications and can break during processing steps.

Therefore, there remains a need for methods and compositions that overcome these deficiencies and that effectively provide recycled polyethylene teraphthalate compositions, fibers, and articles.

SUMMARY

In accordance with the purpose(s) of the invention, as embodied and broadly described herein, the invention, in one aspect, relates to recycled polyethylene teraphthalate compositions, fibers and articles produced therefrom, and methods for producing same.

Disclosed are extruded polymer compositions comprising polyethylene terephthalate present as up to about 100% curbside post-consumer polyethylene terephthalate by weight and balance virgin polyethylene terephthalate.

Also disclosed are polymer mixtures comprising polyethylene terephthalate present as up to about 100% homogeneous curbside post-consumer polyethylene terephthalate by weight and balance virgin polyethylene terephthalate.

Also disclosed are fibers extruded from polyethylene terephthalate present as up to about 100% curbside post-consumer polyethylene terephthalate by weight and balance virgin polyethylene terephthalate.

Also disclosed are Bulked Continuous Filament extruded fibers comprising a polymer composition of polyethylene terephthalate present as up to about 100% curbside post-consumer polyethylene terephthalate by weight and balance virgin polyethylene terephthalate.

Also disclosed are Bulked Continuous Filament fibers extruded from a polymer composition comprising polyethylene terephthalate present as up to about 100% curbside post-consumer polyethylene terephthalate by weight and balance virgin polyethylene terephthalate.

Also disclosed are homogenized curbside post-consumer polyethylene terephthalate.

Also disclosed are processes for preparing recycled polyethylene terephthalate compositions comprising the step of blending curbside post-consumer polyethylene terephthalate to homogeneity prior to mixing with virgin polyethylene terephthalate.

Also disclosed are processes for preparing recycled polyethylene terephthalate compositions comprising the step of mixing homogeneous curbside post-consumer polyethylene terephthalate with virgin polyethylene terephthalate prior to extrusion of the mixture.

Also disclosed are processes for preparing a recycled polyethylene terephthalate composition comprising the step of extruding a mixture of homogeneous curbside post-consumer polyethylene terephthalate and virgin polyethylene terephthalate Also disclosed are processes for preparing recycled polyethylene terephthalate compositions comprising the step of blending curbside post-consumer polyethylene terephthalate to homogeneity prior to extrusion.

Also disclosed are processes for preparing recycled polyethylene terephthalate compositions comprising the steps of blending curbside post-consumer polyethylene terephthalate to homogeneity; optionally, crystallizing the homogeneous curbside post-consumer polyethylene terephthalate; drying the homogeneous curbside post-consumer polyethylene terephthalate; mixing the homogeneous curbside post-consumer polyethylene terephthalate with virgin polyethylene terephthalate; and extruding the mixture.

Also disclosed are the products of the disclosed processes.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects and together with the description serve to explain the principles of the invention.

Figure 1:
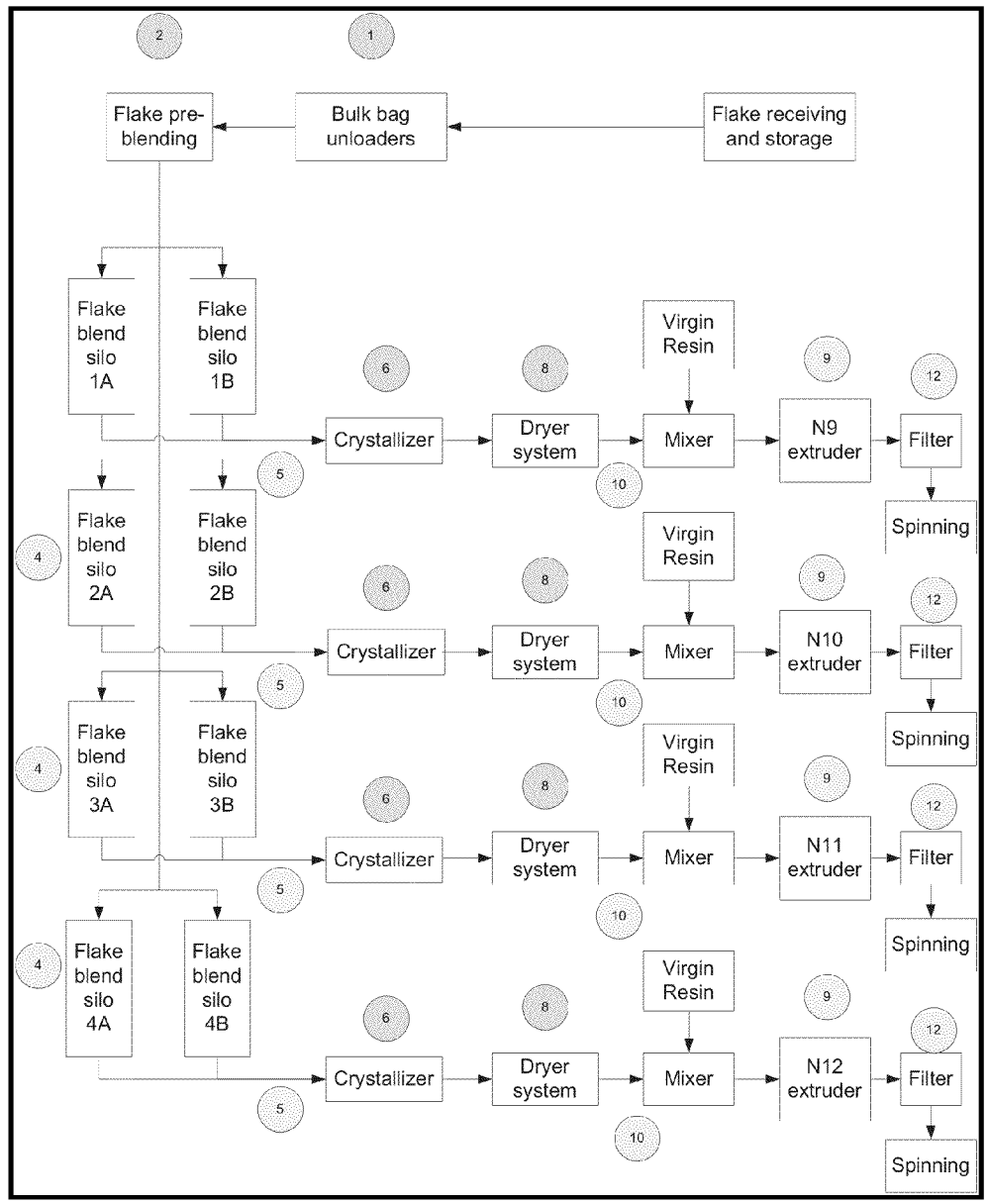
FIG. 1 is a flowchart showing an exemplary method for processing post-consumer polyethylene terephthalate (PET) bulked continuous filament (BCF).

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

A. Definitions

As used in the specification and the appended claims, the singular forms "a," "an" and "the" include plural referents unless the context clearly dictates otherwise. Thus, for example, reference to "a composition," "a fiber," or "a step" includes mixtures of two or more such functional compositions, fibers, steps, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not.

As used herein, the term "residue" refers to a moiety that is the resulting product of the chemical species in a particular reaction scheme or subsequent formulation or chemical product, regardless of whether the moiety is actually obtained from the chemical species. Thus, an ethylene glycol residue in a polyester refers to one or more —$OCH_2CH_2O$— units in the polyester, regardless of whether ethylene glycol was used to prepare the polyester. Similarly, a sebacic acid residue in a polyester refers to one or more —$CO(CH_2)_8CO$— moieties in the polyester, regardless of whether the residue is obtained by reacting sebacic acid or an ester thereof to obtain the polyester.

As used herein, the term "polymer" refers to a relatively high molecular weight organic compound, natural or synthetic, whose structure can be represented by a repeated small unit, the monomer (e.g., polyethylene, rubber, cellulose). Synthetic polymers are typically formed by addition or condensation polymerization of monomers. Homopolymers (i.e., a single repeating unit) and copolymers (i.e., more than one repeating unit) are two categories of polymers.

As used herein, the term "copolymer" refers to a polymer formed from two or more different repeating units (monomer residues). By way of example and without limitation, a copolymer can be an alternating copolymer, a random copolymer, a block copolymer, or a graft copolymer. It is also contemplated that, in certain aspects, various block segments of a block copolymer can themselves comprise copolymers.

As used herein, the term "molecular weight" (MW) refers to the mass of one molecule of that substance, relative to the unified atomic mass unit u (equal to $1/12$ the mass of one atom of carbon-12).

As used herein, the term "number average molecular weight" ($M_n$) refers to the common, mean, average of the molecular weights of the individual polymers. $M_n$ can be determined by measuring the molecular weight of n polymer molecules, summing the weights, and dividing by n. $M_n$ is calculated by:

$$\overline{M}_n = \frac{\sum_i N_i M_i}{\sum_i N_i},$$

wherein $N_i$ is the number of molecules of molecular weight $M_i$. The number average molecular weight of a polymer can be determined by gel permeation chromatography, viscometry (Mark-Houwink equation), light scattering, analytical ultracentrifugation, vapor pressure osmometry, end-group titration, and colligative properties.

As used herein, the term "weight average molecular weight" ($M_w$) refers to an alternative measure of the molecular weight of a polymer. $M_w$ is calculated by:

$$\overline{M}_w = \frac{\sum_i N_i M_i^2}{\sum_i N_i M_i},$$

wherein $N_i$ is the number of molecules of molecular weight $M_i$. Intuitively, if the weight average molecular weight is w, and a random monomer is selected, then the polymer it belongs to will have a weight of w, on average. The weight average molecular weight can be determined by light scattering, small angle neutron scattering (SANS), X-ray scattering, and sedimentation velocity.

As used herein, the terms "polydispersity" and "polydispersity index" refer to the ratio of the weight average to the number average ($M_w/M_n$).

As used herein, the terms "polyethylene terephthalate" and "PET" refer to a thermoplastic polyester resin that can exist both as an amorphous (transparent) and as a semi-crystalline (opaque and white) material. PET can also exist as a semicrystalline transparent material, as used in the side walls of PET bottles. In such aspects, the crystals are smaller than the wavelength of visible light and thus do not make the material opaque and white. PET can be represented with the following structural formula:

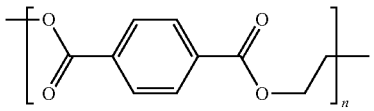

PET can be used in synthetic fibers; beverage, food and other liquid containers; thermoforming applications; and engineering resins, often in combination with glass fiber. Its monomer can be synthesized by the esterification reaction between terephthalic acid and ethylene glycol with water as a byproduct, or the transesterification reaction between ethylene glycol and dimethyl terephthalate with methanol as a byproduct. Polymerization can be through a polycondensation reaction of the monomers with ethylene glycol as the byproduct.

The terms "polyethylene terephthalate" and "PET" include both PET polymers and copolymers. For example, PET can be provided as a copolymer having, in addition to terephthalic acid residues and ethylene glycol residues, additional isophthalic acid residues and/or cyclohexanedimethanol residues. It is also understood that PET polymer and/or copolymer can be provided as part of a polymer blend.

As used herein, the terms "new" and "virgin," when used in connection with polymeric material, refer to polymeric material that is not post-consumer (or post-industrial) polymeric material.

As used herein, the term "post-consumer," when used in connection with polymeric material, refers to polymeric material collected from the end consumer of a material stream. Post-consumer (or post-industrial) polymeric material can, in contrast to virgin polymeric material, typically contain impurities resulting from use in consumer (or industrial) products prior to recovery for recycling.

As used herein, the term "crystallized," when used in connection with polyethylene terephthalate, refers to polymer that has been subjected to crystallizing conditions (e.g., heat to a temperature above the glass transition temperature ($T_g$) of polyethylene terephthalate) sufficient to minimize or eliminate sticking during a subsequent processing step, for example, a drying step.

As used herein, the term "homogeneous" when used in connection with polymeric material, refers to material mechanically blended to a uniform state sufficient to minimize or eliminate streaking in textiles such as carpet and/or breaking of extruded material during a subsequent processing step, for example, an extrusion step, twisting, or tufting.

As used herein, the term "deposit" when used in connection with post-consumer polymeric material, refers to post-consumer polymeric material that is deposit grade. Deposit grade is the highest quality baled post-consumer polymer, for example, PET. Deposit polymer mainly comes from PET soda bottles collected in one of about nine U.S. states, wherein a bottle deposit system encourages their return. Deposit materials command a premium price in the marketplace.

As used herein, the term "curbside" when used in connection with post-consumer polymeric material, refers to post-consumer polymeric material that is generally lower quality baled post-consumer polymer, for example, PET. Curbside polymer mainly comes from soda, water, and custom PET bottles, usually including other types of resins. Sand, glass, PVC, and dirt are common contaminants.

As used herein, the term "pellet" when used in connection with post-consumer polymeric material, refers to post-consumer polymeric material that is provided in a pelletized form, similar to the form of commercial virgin polymer.

As used herein, the term "flake" when used in connection with post-consumer polymeric material, refers to post-consumer polymeric material that is provided in irregular, flaked form, typically from mechanically comminuted polymer material.

As used herein, the term "staple fiber" refers to relatively short lengths of fiber, typically chopped from continuous filament into lengths of 4" to 7½". The lengths can be spun together to create strands of yarn.

As used herein, the term "bulked continuous filament fiber" refers to continuous strands of synthetic fiber formed into yarn bundles of a given number of filaments and typically texturized to increase bulk and cover.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Recycled Polyethylene Terephthalate

In one aspect, the invention relates to recycled polymer compositions prepared from post-consumer polyethylene terephthalate. For example, a recycled polymer composition can be prepared from homogenized curbside post-consumer polyethylene terephthalate, which can be present in pelletized form, in flaked form, or in a combination thereof. As further examples, recycled polymer compositions can be provided as polymer mixtures, as extruded polymer compositions, as fibers, and/or as bulked continuous filament fibers.

In one aspect, a recycled post-consumer polymer (e.g., curbside post-consumer polyethylene terephthalate) composition can be extruded to provide a bulked continuous filament fiber.

It is understood that the disclosed compositions, mixtures, and fibers can be employed in connection with the disclosed fibers, methods, and uses.

1. Mixtures and Compositions

In one aspect, the invention relates to polymer mixtures comprising polyethylene terephthalate present as up to about 100% homogeneous curbside post-consumer polyethylene terephthalate by weight and balance virgin polyethylene terephthalate.

In a further aspect, the invention relates to extruded polymer compositions comprising polyethylene terephthalate present as up to about 100% curbside post-consumer polyethylene terephthalate by weight and balance virgin polyethylene terephthalate.

2. Fibers

In a still further aspect, the invention relates to fibers extruded from polyethylene terephthalate present as up to about 100% curbside post-consumer polyethylene terephthalate by weight and balance virgin polyethylene terephthalate. For example, the fiber can be a Bulked Continuous Filament extruded fiber comprising a polymer composition of polyethylene terephthalate present as up to about 100% curbside post-consumer polyethylene terephthalate by weight and balance virgin polyethylene terephthalate. As a further example, the fiber can be a Bulked Continuous Filament fiber extruded from a polymer composition comprising polyethylene terephthalate present as up to about 100% curbside post-consumer polyethylene terephthalate by weight and balance virgin polyethylene terephthalate.

3. Post-Consumer Content

In one aspect, at least a portion of the disclosed compositions comprise post-consumer polyethylene terephthalate. In one aspect, the post-consumer polyethylene terephthalate is curbside post-consumer polyethylene terephthalate. In one aspect, the balance of the composition can be virgin polyethylene terephthalate.

In a further aspect, polyethylene terephthalate is present as at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% curbside post-consumer polyethylene terephthalate by weight.

In a further aspect, polyethylene terephthalate is present as up to about 5%, up to about 10%, up to about 15%, up to about 20%, up to about 25%, up to about 30%, up to about 35%, up to about 40%, up to about 45%, up to about 50%, up to about 55%, up to about 60%, up to about 65%, up to about 70%, up to about 75%, up to about 80%, up to about 85%, up to about 90%, or up to about 95% curbside post-consumer polyethylene terephthalate by weight.

In further aspects, the polyethylene terephthalate can be present as about 100% curbside post-consumer polyethylene terephthalate by weight, or virgin polyethylene terephthalate can be absent.

4. Raw Materials

In one aspect, the raw materials can be selected for compatibility with the disclosed processes. For example, curbside post-consumer polyethylene terephthalate can be present in pelletized form, in flaked form, or a mixture thereof.

As a further example, curbside post-consumer polyethylene terephthalate flakes can be selected for one or more of the following specifications: Bulk density (lb/ft3) of 20-27; Moisture content (%) of <1.0%; Floatable contamination (ppm) of <25; PVC contamination (ppm) of <150; Metal contamination (ppm) of <10; Other non-melting particles (ppm) of <50; Green pet contamination (ppm) of <5000; Light blue contamination (ppm) of <75,000; Low melt material (PETG) (ppm) of <50; Black PET (ppm) of <50; Pressure rise (psi per pound) of <75 psi/lb; b Color values as measured by a HunterLabs Spectrophotometer of 0-3 units, and/or L Color values as measured by a HunterLabs Spectrophotometer of greater than 50 units.

As a further example, curbside post-consumer polyethylene terephthalate pellets can be selected for one or more of the following specifications: bulk density greater than about 45 lbs/ft3; pressure rise of less than about 35 psi/lb with IV solution viscosity of greater than 0.70; and pellet count of about 50-70 pellets/gram; Hunter Color L value (crystallized pellet) of greater than about 60; and Color B value of less than about 6.

Commercial suppliers of suitable post-consumer polyethylene terephthalate flake/pellet materials can be found in the directory of the Association of Postconsumer Plastic Recyclers.

5. Impurities

Post consumer polyethylene terephthalate, for example curbside PET, can contain various impurities, for example, sand, glass, colorants, paper, other polymers (e.g., PVC, PETG), metals, adhesives, syrups, fillers, and dirt. In various aspects, impurities can be present in post-consumer polyethylene terephthalate as one or more of floatable contamination; PVC contamination; metal contamination; other non-melting particles; green PET contamination; light blue PET contamination; low melt material (such as PETG); and black PET contamination. In contrast, such impurities are typically substantially absent from virgin PET.

In a further aspect, one or more impurities can be present as up to about 10 ppm, about 25 ppm, about 50 ppm, about 100 ppm, about 500 ppm, about 1000 ppm, about 5000 ppm, about 1%, about 2%, about 3%, about 5%, about 7.5%, or about 10% by weight. In a further aspect, total impurity content can be up to about 10 ppm, about 25 ppm, about 50 ppm, about 100 ppm, about 500 ppm, about 1000 ppm, about 5000 ppm, about 1%, about 2%, about 3%, about 5%, about 7.5%, or about 10% by weight.

In a further aspect, one or more impurities can be present as less than about 10 ppm, about 25 ppm, about 50 ppm, about 100 ppm, about 500 ppm, about 1000 ppm, about 5000 ppm, about 1%, about 2%, about 3%, about 5%, about 7.5%, or about 10% by weight. In a further aspect, total impurity content can be up to about 10 ppm, about 25 ppm, about 50 ppm, about 100 ppm, about 500 ppm, about 1000 ppm, about 5000 ppm, about 1%, about 2%, about 3%, about 5%, about 7.5%, or about 10% by weight.

6. Additives

The disclosed compositions can further comprise one or more additives known to those of skill in the art. That is, one of skill can readily modify one or more properties of the disclosed compositions by selection and inclusion of one or more additives. As examples, the one or more additives can be selected from plasticizers, opacifiers, nucleating agents, colorants, dyes, clarifiers, diluents, and/or fillers.

In various aspects, one or more additives can be present as up to about 0.5%, up to about 1%, up to about 2%, up to about 3%, up to about 4%, up to about 5%, or up to about 10% of the composition by weight.

In various aspects, one or more additives can be present as less than about 0.5%, less than about 1%, less than about 2%, less than about 3%, less than about 4%, less than about 5%, or less than about 10% of the composition by weight.

C. Uses

The disclosed compositions exhibit utility in various articles commonly manufactured from polymer compositions, in particular, from polyethylene terephthalate compositions. In one aspect, the compositions can be provided as fibers, for example, as bulked continuous filament fibers. These fibers can be employed in textile articles, including carpet. Thus, in one aspect, the invention relates to a carpet comprising a disclosed polymer composition or a disclosed fiber. In a further aspect, the invention relates to a carpet comprising a product of a disclosed process.

It is understood that the disclosed uses can be employed in connection with the disclosed fibers, compositions, methods, and mixtures.

D. Processes for Preparing Recycled Polyethylene Terephthalate

In one aspect, the invention relates to a process for preparing a recycled polyethylene terephthalate composition comprising the step of blending curbside post-consumer polyethylene terephthalate to homogeneity prior to mixing with virgin polyethylene terephthalate. In a further process, the invention relates to a process for preparing a recycled polyethylene terephthalate composition comprising the step of mixing homogeneous curbside post-consumer polyethylene terephthalate with virgin polyethylene terephthalate prior to extrusion of the mixture. In a further process, the invention relates to a process for preparing a recycled polyethylene terephthalate composition comprising the step of extruding a mixture of homogeneous curbside post-consumer polyethylene terephthalate and virgin polyethylene terephthalate. In a further process, the invention relates to a process for preparing a recycled polyethylene terephthalate composition comprising the step of blending curbside post-consumer polyethylene terephthalate to homogeneity prior to extrusion.

It is understood that the disclosed processes can be employed in connection with the disclosed fibers, compositions, mixtures, and uses.

1. System Components

As illustrated in FIG. 1, the method for processing post-consumer PET can exemplarily comprise at least one of: at least one blending means, at least one crystallizer, at least one drying means, at least one extruder, and at least one spinnerette. Additionally, at least one filtration means and/or at least one mixing means can be present.

In one aspect, the at least one blending means 2 can comprise at least one conventional active blender with an auger, configured to increase the uniformity of the post-consumer PET flakes and/or pellets contained therein. In another aspect, the at least one blending means can further comprise at least one conventional blending silo 4, 5 configured to further improve blended flake and/or pellet uniformity. In one aspect, the at least one blending silo can include a recirculation means and at least one flow channel to improve uniformity, as known in the arts. In another aspect, the at least one blending silo can be dimensioned to process post-consumer PET flake and/or pellet lot sizes of up to 500,000 pounds. For example, in one aspect, the at least one blending silo 4, 5 can be dimensioned to process flake and/or pellet lot sizes of about 250,000 pounds. One non-limiting example of a suitable blending silo is a Directed Flow Channel (DFC) Blender which is commercially available from Columbian TecTank, 5400 Kansas Avenue, Kansas City, Kans. 66106. Another non-limiting example is the 1500 cu. ft model batch mixer from Sprout Waldron (Muncy, Pa. USA).

The at least one blending means, in one aspect, can further comprise at least one bulk bag unloading means 1 configured to allow direct mixing of a plurality of infeed lots into the at least one blending silo. In another aspect, the at least one bulk bag unloading means can be configured to allow direct mixing of up to four different infeed lots into the at least one blending silo. In a further aspect, this direct mixing can be customized to allow for optimal blending, if desired. In another aspect, the at least one bulk bag unloading means 1 can be a conventional, commercially available bulk bag unloader.

In one aspect, the at least one crystallizer 6 can be a conventional, commercially available crystallizer configured for crystallizing virgin PET and/or post-consumer PET.

In another aspect, the drying means 8 can comprise a conventional, commercially available dryer system configured for drying virgin PET and/or post-consumer PET.

Figure 2:
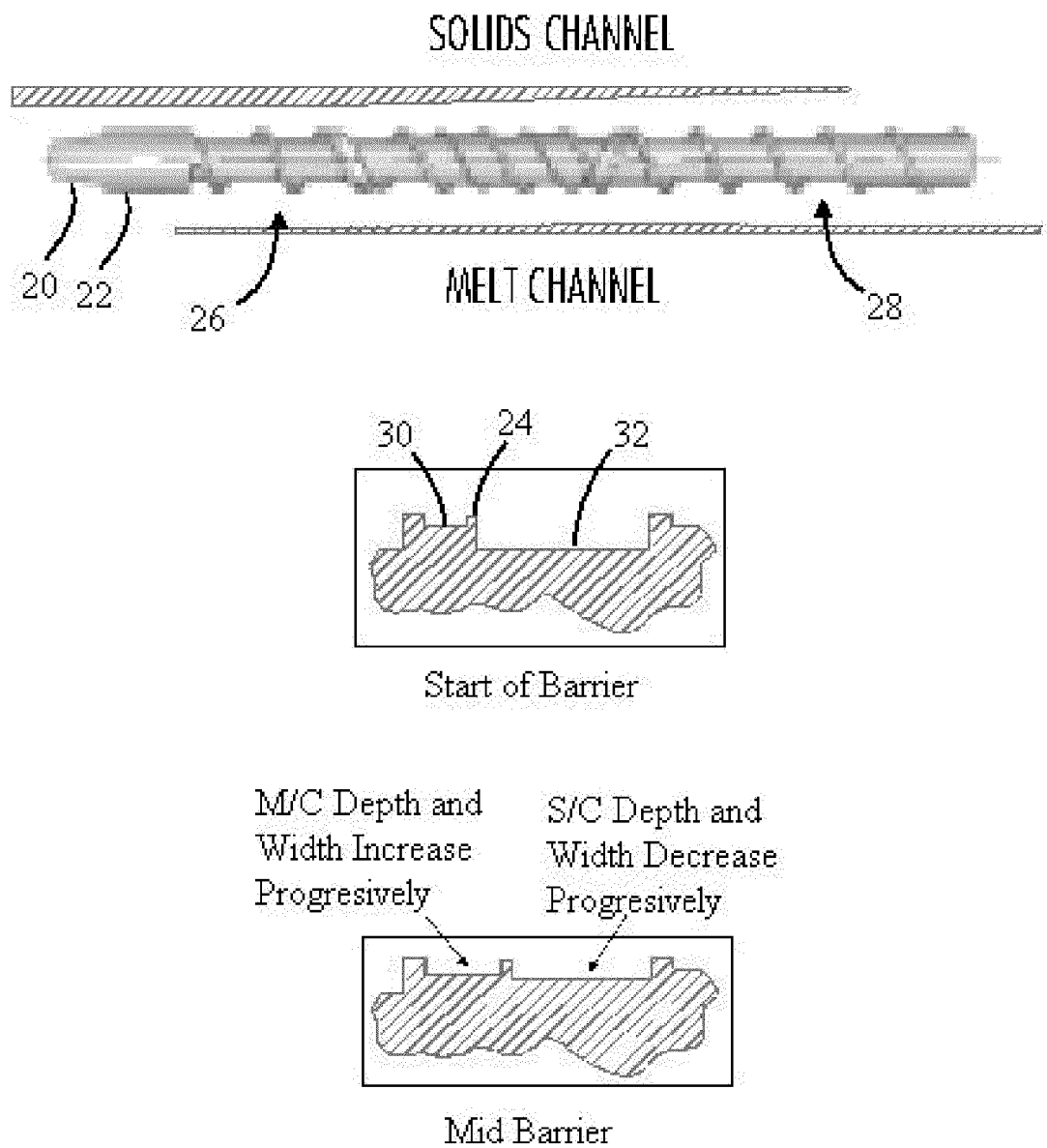
FIG. 2 is a schematic showing side- and cross-sectional views of barrier extrusion screws that can be useful in the disclosed processes.

The at least one extruder 9 can comprise an extruder screw and an extruder mixing element 10. One embodiment of the extruder screw is illustrated in FIG. 2. In one aspect, the extruder screw 20 can comprise a conventional barrier screw 22 configured such that pressure and/or temperature fluctuations are minimized in the fiber extrusion process. In another aspect, the extruder screw can comprise a barrier flight 24 introduced in a transition section between the feed zone 26, wherein material to be processed is introduced into the extruder screw, and a metering zone 28, wherein material to be processed is introduced into a filtering means. The barrier flight can define two channels, a melt channel 30 and a solids channel 32, and can have clearance between a tip of the barrier flight and a wall of the barrel containing the screw. This clearance can allow molten virgin PET and/or post-consumer PET to pass from the solids channel into the melt channel. One example of such an extruder screw is the DSB-1 barrier screw commercially available from Davis-Standard LLC, #1 Extrusion Drive, Pawcatuck, Conn. 06379. Suitable models of the DSB-1 include a Moderate Work Barrier Screw having a 30:1 Length/Diameter ratio and a deep feed, and a Moderate/Low Work Barrier Screw having a 34:1 L/D ratio.

In one aspect, when compared to extrusion of virgin PET, extrusion of a blend of post-consumer PET and virgin PET blend can require one or more of deepening the feed section of the extruder screw, use of a barrier flighted mixing screw and increased power availability in the drive system for the extruder. In another aspect, an extrusion profile is used that minimizes heat generation along the length of the barrel (while still assuring adequate heat input for melting the different variants of post-consumer PET flakes).

The extruder mixing element 10 can comprise a conventional loss-in-weight mixing unit having at least one hopper mounted adjacent the at least one extruder 9. Two examples of such an extruder mixing element are the XGGCYUMFFK01 or XLGCYYUMKLX01s mixers commercially available from the Process Control Corporation. The at least one hopper can comprise a mixing means to introduce virgin PET and/or post-consumer PET into the extruder screw.

The at least one filtering means 12 can comprise a conventional plastic melt filtration unit comprising an automatic backflushing filtering system configured to minimize downtime of the extruder. In one aspect, the at least one filtering means can be able to process at least 1,000 pounds of post-consumer PET per hour per filter. In another aspect, the at least one filtering means can preferably process at least 1,000 pounds of post-consumer PET per hour per filter. For example, about 1,000 pounds of post-consumer PET per hour per filter, about 2,500 pounds of post-consumer PET per hour per filter, about 5,000 pounds of post-consumer PET per hour per filter, or about 10,000 pounds of post-consumer PET per hour per filter. In yet another aspect, the at least one filtering means can remove particles as small as about 50 microns from the meltstream. However, it is contemplated that the at least one filtering means can remove from the meltstream, for example, particles that are about 10 microns in size, about 25 microns in size, about 50 microns in size, or about 100 microns in size. One example of a suitable filtering means is a Gneuss RSF-60 Rotary Filtration System, which is commercially available from Gneuss Inc., 10820-G, Independence Pointe Parkway, Matthews, N.C. 28105.

The at least one spinnerette can be a conventional spinnerette comprising at least one melt pump configured to pump melted virgin PET and/or post-consumer PET to at least one spinner, to produce fiber.

2. Assembly and Use

With reference to FIG. 1, a system for processing post-consumer PET can be assembled to comprise any or all of the components as described above. In one aspect, the at least one bulk bag unloading means 1 can be operatively coupled to the blending means 2, so that a plurality of infeed lots can input post-consumer PET into the blending means. Optionally, virgin PET can be introduced can be input into the blending means, alone or in combination with the post-consumer PET. In another aspect, the blending means, which can comprise the at least one active blender and/or the at least one blending silo 4, the at least one crystallizer 6, the at least one drying means 8, and the at least one extruder 9 can be operative coupled serially. Thus, virgin PET and/or post-consumer PET pellets and/or flakes can be transported from the at least one bulk bag unloading means to the at least one blending means, from the at least one blending means to the at least one crystallizer, from the at least one crystallizer to the at least one drying means, and from the at least one drying means to the at least one extruder. As can be appreciated by one of skill in the art, the pellets and/or flakes may be transported pneumatically, conveyed on a belt, be gravity fed, and/or transported by other means.

In another aspect, the at least one filtering means 12 can be attached to the at least one extruder to filter contaminants from the meltstream, before entering the spinnerette for production of fiber. As also can be appreciated by one of skill in the art, components processing molten virgin PET and/or post-consumer PET can be in fluid communication with each other by, for example, at least one pipe.

In use, in one aspect, post-consumer PET pellets and/or flakes in bulk bags can be unloaded by the at least one bulk bag unloading means 1 into the at least one blending means 2, such as the at least one active blender. The at least one active blender, in another aspect, can have an auger for blending the post-consumer PET pellets and/or flakes. In another aspect, the post-consumer PET pellets and/or flakes can be transported from the at least one active blender into the at least one blending silo 4,5 until a homogenous mixture of post-consumer PET is formed therein the silo. In still another aspect, the post-consumer PET pellets and/or flakes can be diverted into a plurality of blending silos 4,5 so that a greater amount of material can be processed at a given time. In yet another aspect, the amount of time necessary for homogenous blending to occur can vary depending on the model of active blender and/or blending silo used, and can be provided by the respective equipment manufacturer. In one aspect, homogenous blending can be achieved in about 2 hours. In another aspect, homogenous blending can be achieved in about 36 hours. In yet another aspect, homogenous blending can be achieved in about 48 hours.

In one aspect, in order to test the homogeneity of a blend, a known amount of PET having a known color can be inserted into the at least one active blender and/or the at least one blending silo. A known amount of an exogenous tracing marker can also be inserted into the at least one active blender and/or the at least one blending silo. An exogenous tracing marker can be provided with a known property (e.g., color, fluorescence, etc.) readily measurable in samples taken from the mixture. The PET having a known color and the exogenous tracing marker can be blended together and the resulting mixture can be checked periodically for marker distribution levels. The blending can continue until the percentage of marker in a sample is substantially equal to the percentage of marker in the at least one active blender and/or the at least one blending silo.

In a further aspect, the homogenized blend of post-consumer PET can then be transported to the at least one crystallizer 6. The manufacturer of the crystallizer can supply a temperature and time required to crystallize the post-consumer PET, which can prevent the post-consumer PET from sticking within the system. After crystallization, in yet another aspect, the post-consumer PET pellets and/or flakes can enter the at least one drying means 8 for removal of moisture from the post-consumer PET. Again, the manufacturer of the respective drying means can provide a required drying time. Alternatively, a moisture sensor can be used to determine if the post-consumer PET is sufficiently dry for further processing. In one aspect, the post-consumer PET can be dried to a moisture level of about 25-200 ppm. In another aspect, the post-consumer PET can be dried to a moisture level of about 50-100 ppm. In one aspect, residence time post-consumer PET in the drying means can be at least five hours. In a further aspect, the dew point in the drying means can be −20° F.

In a further aspect, upon exiting the at least one drying means, the post-consumer PET pellets and/or flakes can enter the at least one hopper of the extruder mixing element of the at least one extruder 9. At this point, in one aspect, virgin PET can also be added to another hopper of the extruder mixing element. The at least one hopper can feed the blended post-consumer PET and virgin PET into the extruder at the desired mixture ratio by following the extruder mixing element manufacturer instructions. In another aspect, the percentage of post-consumer PET present in the mixture of post-consumer PET and virgin PET that is fed into the extruder can be at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% post-consumer PET by weight. In yet another aspect, the percentage of post-consumer PET present in the mixture of post-consumer PET and virgin PET that is fed into the extruder can be up to about 5%, up to about 10%, up to about 15%, up to about 20%, up to about 25%, up to about 30%, up to about 35%, up to about 40%, up to about 45%, up to about 50%, up to about 55%, up to about 60%, up to about 65%, up to about 70%, up to about 75%, up to about 80%, up to about 85%, up to about 90%, or up to about 95% post-consumer PET by weight.

In one aspect, the virgin PET/post-consumer PET mixture can enter the feed zone 26 of the barrier screw 22 of the at least one extruder 9. The barrier screw can rotate, urging the mixture into a barrier zone wherein the virgin PET/post-consumer PET mixture can melt into a liquid that can enter the melt channel 30 of the barrier screw. The melted mixture can then be urged into the metering zone 28 of the barrier screw, configured to feed the melted mixture at an appropriate pressure to the at least one filtering means.

In one aspect, the extruder profile of the at least one extruder can be set to temperatures between about 250-350° C. In still another aspect, the extruder profile can be set to temperatures between about 280-305° C. In another aspect, the extruder profile can be set to a temperature to produce a melt temperature between about 275-325° C. at the end of the extruder. In still another aspect, the extruder profile can be set to a temperature to produce a melt temperature between about 285-300° C. at the end of the extruder.

In one aspect, the extruder control pressure can be set at a pressure that produces adequate polymer supply to the spin pack metering pumps of the at least one spinnerette. In another aspect, melt pressure variations related to filtration equipment should be kept less than 25 bar to minimize polymer melt temperature variation, In another aspect, the filtering means can remove any unmelted particles and/or other contaminants from the melted mixture. This can, in one aspect, help prevent weak spots from being created in the fiber. The filtered, melted mixture can then be introduced into the spinnerette, wherein the melted mixture is urged through a die to form a fiber. The fiber can be cooled and wound onto a bobbin for further processing.

In one aspect, the at least one spinnerette can have a polymer spin pump speed having less than 5% variation from target setting across the line. In another aspect, the at least one spinnerette can have a polymer spin pump speed having less than 1% variation from target setting across the line. According to another aspect, the texturizing system roll speeds of the at least one spinnerette can be controlled to +/−4 m/min, and the texturizing system roll temperatures can be controlled to within +/−4° C. In another aspect, the texturizing system roll speeds of the at least one spinnerette can be controlled to +/−2 m/min and the texturizing system roll temperatures can be controlled to within +/−2° C. In yet another aspect, the spinning draw ratio of the at least one spinnerette can be between 3.0 and 5.5 In another aspect, the spinning draw ratio of the at least one spinnerette can be between 3.7 and 4.4 In one aspect, the texturizer jet pressures and temperatures of the at least one spinnerette can be controlled to +/−4° C. and less than 1.0 bar range. In another aspect, the texturizer jet pressures and temperatures of the at least one spinnerette can be controlled to +/−2° C. and less than 0.5 bar range. The tack system and pressure can be controlled within a 1.0 bar range, according to one aspect. In another aspect, the tack system and pressure can be controlled within a 0.5 bar range.

In one aspect, the fiber formed from by the virgin PET/post-consumer PET mixture, referred to as singles yarn, can be processed, for example, into yarn by twisting, as commonly known in the arts. In a further aspect, the singles yarn produced can be wound at a tension between about 100-300 grams. In a further aspect, finish oil can be added as percentage of weight between about 1.0-1.5%. In a further aspect, substantially all of the singles yarn of the twisted yarn can be formed from the virgin PET/post-consumer PET mixture. In yet another aspect, at least one of the singles yarn of the twisted yarn can be formed from the virgin PET/post-consumer PET mixture. In still another aspect, any number of the singles yarn of the twisted yarn can be formed from the virgin PET/post-consumer PET mixture.

In one aspect, the twisted yarn containing at least one singles yarn produced by the virgin PET/post-consumer PET mixture can be tufted into carpet, also as commonly known in the arts. In a further aspect, substantially all of the twisted yarn of the carpet can be formed from singles yarn formed from the virgin PET/post-consumer PET mixture. In yet another aspect, at least one of the twisted yarns of the carpet can be formed from singles yarn formed from the virgin PET/post-consumer PET mixture. In still another aspect, any number of the twisted yarns of the carpet can be formed from singles yarn formed from the virgin PET/post-consumer PET mixture.

3. Selecting Raw Materials

In one aspect, curbside post-consumer PET can be selected so that it can meet or exceed at least one of the following specifications: Bulk density (lb/ft3) of 20-27; Moisture content (%) of <1.0%; Floatable contamination (ppm) of <25; PVC contamination (ppm) of <150; Metal contamination (ppm) of <10; Other non-melting particles (ppm) of <50; Green pet contamination (ppm) of <5000; Light blue contamination (ppm) of <75,000; Low melt material (PETG) (ppm) of <50; Black PET (ppm) of <50; Pressure rise (psi per pound) of <75 psi/lb; b Color values as measured by a HunterLabs Spectrophotometer of 0-3 units, and/or L Color values as measured by a HunterLabs Spectrophotometer of greater than 50 units.

4. Blending

In one aspect, the disclosed processes can include a blending step to homogenize the profile of post-consumer PET input to the extruder. For example, at least one blending silo can comprise a recirculation line to recirculate, and thereby blend, post-consumer PET therein. In another example, the at least one blending silo can comprise multiple flow channels to help blend post-consumer PET therein. The blending step, in one aspect, can reduce the variation in particle size, color variation, copolymer content, and contamination to provide a more homogeneous blend of post-consumer PET to the extruder. In another aspect, the blending step can comprise blending the post-consumer PET therein the blending silo until a desired level of homogenization is reached. In yet another aspect, the blending step can comprise blending the post-consumer PET therein the blending silo for a period of time effective to homogenate the mixture. In still another aspect, the blending step can comprise blending the post-consumer PET therein the blending silo for a specific period of time, for example, 2 hours, 4 hours, 8 hours, 12 hours, 16 hours, 24 hours, 36 hours, or 72 hours.

5. Crystallization

In one aspect, the disclosed process can include a crystallization step. For example, the post-consumer PET pellets and or flakes can be heated to an elevated temperature while being constantly stirred and/or agitated for a period of time. In another aspect, the crystallization step can take place in a crystallizer, comprising a heatable container with a series of paddles or agitators therein. In other aspects, the crystallization step can take place in a crystallizer comprising a hot, fluidized bed for keeping the pellets and/or flakes apart. Crystallization can be accomplished by employing commercially available equipment known to those of skill.

6. Drying

In one aspect, the disclosed processes can include a drying step. For example, the post-consumer PET pellets and/or flakes can be dried in a conventional PET dryer. In one aspect, the post-consumer PET pellets and/or flakes can be dried to a moisture level. In a further aspect, post-consumer PET pellets and/or flakes can be dried for a period of time. Drying can be performed, for example, to achieve a moisture level of less than about 5%, less than about 4%, less than about 3%, less than about 2%, less than about 1%, less than about 0.5%, less than about 0.25%, less than about 1000 ppm, less than about 500 ppm, or less than about 100 ppm. In a further aspect, moisture levels can be reduced to from about 50 ppm to about 100 ppm. In a further aspect, moisture levels can be reduced to a level sufficient to minimize or eliminate the effect of moisture during subsequent processing steps.

7. Mixing

In one aspect, the disclosed processes can include a mixing step. For example, the post-consumer PET pellets and/or flakes can be mixed with virgin PET pellets and/or flakes to create a post-consumer PET/virgin PET mixture. In one aspect, the percentage of post-consumer PET in the mixture can be at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% post-consumer PET by weight. In another aspect, the percentage of post-consumer PET present in the mixture of post-consumer PET and/or virgin PET that is fed into the extruder can be up to about 5%, up to about 10%, up to about 15%, up to about 20%, up to about 25%, up to about 30%, up to about 35%, up to about 40%, up to about 45%, up to about 50%, up to about 55%, up to about 60%, up to about 65%, up to about 70%, up to about 75%, up to about 80%, up to about 85%, up to about 90%, or up to about 95% post-consumer PET by weight.

In a further aspect, the mixing step can occur in a mixer. In one aspect, the mixer can be an extruder mixing element comprising at least one hopper, which feeds the extrusion means. The at least one hopper can comprise a mixing means to introduce virgin PET and/or post-consumer PET into the extruder screw at a specified ratio. In a further aspect, the mixer can be a mixing means within the extruder.

The extruder mixing element 10 can comprise a conventional loss-in-weight mixing unit having at least one hopper mounted adjacent the at least one extruder 9. Two examples of such an extruder mixing element are the XGGCYUMFFK01 or XLGCYYUMKLX01 mixers commercially available from the Process Control Corporation. The at least one hopper can comprise a mixing means to introduce virgin PET and/or post-consumer PET into the extruder screw.

8. Extrusion

In one aspect, the disclosed processes can include an extrusion step. For example, the post-consumer PET/virgin PET mixture can be extruded to produce fiber. In one aspect, the extrusion step can take place in an extruder comprising a screw (e.g., a barrier screw), a filtering means, and/or a spinnerette. Extrusion can be accomplished by employing commercially available equipment known to those of skill.

9. Additives

In one aspect, the disclosed processes can include the addition of additives to the post-consumer PET blend and/or the post-consumer PET/virgin PET mixture. As an example, and without limitation, additives can include dyes, colorants, UV absorbers, plasticizers, opacifiers, nucleating agents, clarifiers, diluents, and/or fillers. Additives can be added, for example, contemporaneously with mixing.

E. Experimental

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

In the disclosed examples, twisting and heatsetting, tufting, and dyeing and finishing processes were performed at the same specifications regardless of the percentage of post-consumer PET being processed. Thus, all post-consumer PET samples were processed under the same twisting and heatsetting, tufting, and dyeing and finishing process specifications as the 100% virgin PET control. Although these conditions were employed to provide the disclosed compositions and articles, it is understood that, unless otherwise stated, these conditions are not limiting and can, if desired, be modified to suit other manufacturing needs.

1. Preparation of Yarn and Carpet from Fiber Formed from Post-Consumer Pet Curbside Flakes Fiber containing 50% post-consumer PET, 65% post-consumer PET, 85% post-consumer PET, and 100% RPET was formed, as described above, from curbside grade flakes. As illustrated in Table 1, trials were run with unblended (i.e., not homogenized) curbside flake from two suppliers. Trials were repeated with curbside flake from two suppliers blended together. All trials processed successfully with no significant differences in runability or product physicals except for a shift in color in the compositions (e.g., fibers) produced from curbside flake. The results of the experiments as compared to a control lot containing 0% post-consumer PET are illustrated in Tables 2-8.

TABLE 1

| | | Trial Description | | |
|---|---|---|---|---|
| Trial # | Raw Material | Supplier # | RPET Insertion rate | Blended |
| 1 | Curbside flake | C1 | 50% | No |
| 2 | Curbside flake | C1 | 65% | No |
| 3 | Curbside flake | C1 | 85% | No |
| 4 | Curbside flake | C1 | 100% | No |
| 5 | Curbside flake | C2 | 50% | No |
| 6 | Curbside flake | C2 | 65% | No |
| 7 | Curbside flake | C2 | 85% | No |
| 8 | Curbside flake | C2 | 100% | No |
| 9 | Curbside flake | C1/C2 | 50% | Yes |
| 10 | Curbside flake | C1/C2 | 65% | Yes |
| 11 | Curbside flake | C1/C2 | 85% | Yes |
| 12 | Curbside flake | C1/C2 | 100% | Yes |
| Control | | | 0% | N/A |

This fiber was processed into yarn, as is commonly known in the arts, and compared to a sample of yarn containing 0% post-consumer PET. The result of this comparison is tabulated in Tables 2, 3, 4 and 5. The yarn produced from fiber containing 50% post-consumer PET, 65% post-consumer PET, 85% post-consumer PET and 100% post-consumer PET was tufted into carpet and compared to a sample of carpet containing 0% post-consumer PET. The resulting comparison is illustrated in Tables 6-8.

The test results of the singles yarns formed are illustrated in Table 2. Denier, Finish on Yarn ("FOY"), Modification Ratio ("MR"), Tenacity at Peak Load, Elongation at Peak Load, Nodes per Meter, Crimp, Bulk, and IV Solution Viscosity are conventional industry measurements used to define a yarn. As can be appreciated by one of skill in the arts, and as illustrated in Table 2, there were no significant difference noted between the control sample and the post-consumer PET samples with respect to these physical properties. However, drying times and/or temperatures were adjusted to minimize any impact that increasing post-consumer PET flake content (for both blended and unblended samples) would have on the Modification Ratio and IV. Color of the yarn was measured by a HunterLabs Spectrophotometer. As illustrated in Table 2, as the percentage of post-consumer PET in the yarn increased, the Db increased, indicating that the yarn became more yellow as the percentage of post-consumer PET increased. Note also that the Db standard deviation for blended yarn was lower than for the unblended samples.

The average Db standard deviation of yarn formed from unblended curbside flakes supplied by the first supplier (Trials 1-4) was 0.28, and the average Db standard deviation of yarn formed from unblended curbside flakes supplied by the second supplier (Trials 5-8) was 0.20. The average Db standard deviation of yarn formed from curbside flakes supplied by the first supplier and the second supplier and blended together (Trials 9-12) was 0.17.

flakes supplied by the second supplier (Trials 5-8) was 10.58, and the average tenacity standard deviation of this yarn was 0.629. The average elongation standard deviation of yarn formed from curbside flakes supplied by the first supplier and the second supplier and blended together (Trials 9-12) was 7.79, and the average tenacity standard deviation of yarn formed from these flakes was 0.423.

TABLE 3

% Post-consumer PET Curbside Flake Singles Filament Data

| Trial # | Excl. Pulls | Tenacity @ Break (g/dn) | Tenacity StdDev | Elongation @ Break | Elongation StdDev |
|---|---|---|---|---|---|
| 1 | 7 | 2.540 | 0.723 | 31.580 | 11.344 |
| 2 | 4 | 2.688 | 0.850 | 32.873 | 11.437 |
| 3 | N/A | | | | |
| 4 | 5 | 2.064 | 0.759 | 25.999 | 11.472 |
| 5 | 0 | 3.233 | 0.286 | 36.844 | 7.813 |
| 6 | 2 | 3.023 | 0.596 | 34.827 | 8.109 |
| 7 | 7 | 2.545 | 0.749 | 32.092 | 12.650 |
| 8 | 7 | 2.562 | 0.884 | 34.616 | 13.731 |
| 9 | 0 | 3.200 | 0.342 | 40.612 | 6.974 |
| 10 | 4 | 3.001 | 0.346 | 41.116 | 7.972 |
| 11 | 5 | 2.472 | 0.625 | 31.987 | 9.679 |
| 12 | 1 | 3.186 | 0.380 | 36.866 | 6.533 |
| Control | 0 | 3.160 | 0.427 | 36.363 | 7.730 |

The singles yarns were each twisted with at least one other like yarn (i.e., if a yarn was formed from 50% post-consumer PET provided by Supplier 1, it was twisted with at least one other yarn formed from 50% post-consumer PET provided by

TABLE 2

% Post-consumer PET Curbside Flake Singles Yarn Data

| Trial # | Denier | FOY % OWF | MR | Tenacity (g/d) | Avg Tenacity | % Elong | Avg Elong | Nodes/ m | % Crimp | % Bulk | IV Sol. Viscosity | Db | Db StdDev |
|---|---|---|---|---|---|---|---|---|---|---|---|---|---|
| 1 | 1226 | 1.42 | 2.76 | 1.95 | | 39.4 | | 25 | 10.8 | 29.7 | 0.6305 | 0.71 | 0.13 |
| 2 | 1265 | 1.41 | 2.91 | 2.1 | | 42.6 | | 25 | 10.3 | 30.1 | 0.6677 | 1.34 | 0.37 |
| 3 | 1258 | 1.42 | 2.82 | 2.17 | | 45.3 | | 27 | 10.8 | 34.6 | 0.6534 | 2.60 | 0.17 |
| 4 | 1267 | 1.49 | 2.79 | 2.23 | 2.1125 | 44 | 42.825 | 29 | 10.9 | 34.7 | | 3.17 | 0.46 |
| 5 | 1246 | 1.39 | 2.64 | 2.20 | | 44.4 | | 25 | 10.6 | 31.5 | 0.6882 | 0.54 | 0.12 |
| 6 | 1269 | 1.32 | 2.78 | 2.44 | | 44.3 | | 26 | 9.56 | 32.5 | 0.6898 | 0.48 | 0.10 |
| 7 | 1264 | 1.26 | 2.69 | 2.15 | | 39.2 | | 25 | 10.6 | 34 | 0.6513 | 0.84 | 0.23 |
| 8 | 1259 | 1.24 | 2.72 | 2.18 | 2.2425 | 42.7 | 42.65 | 27 | 10.6 | 33.9 | 0.6679 | 2.01 | 0.37 |
| 9 | 1248 | 1.42 | 2.75 | 2.28 | | 43.3 | | 25 | 9.72 | 32.2 | 0.6641 | 0.8 | 0.15 |
| 10 | 1247 | 1.41 | 2.91 | 2.33 | | 45.5 | | 26 | 9.90 | 30.8 | 0.6782 | 1.18 | 0.15 |
| 11 | 1243 | 1.34 | 2.84 | 2.28 | | 36.4 | | 29 | 9.18 | 29.3 | 0.6694 | 2.24 | 0.21 |
| 12 | 1260 | 1.35 | 2.88 | 2.30 | 2.2975 | 40.7 | 41.475 | 29 | 9.39 | 29.7 | 0.6900 | 1.90 | 0.16 |
| Control | 1252 | 1.38 | 2.78 | 2.48 | | 37.8 | | 25 | 9.22 | 23.6 | 0.6812 | | |

Single filaments were removed from the singles yarns and tested as well. These results are illustrated in Table 3. Excluded Pulls were excluded from the tests because these filaments had a tenacity and/or elongation less than 20% of the average, according to ASTM standards. These samples illustrate that there were improvements in average tenacity, elongation, and their standard deviations with the blended samples. Additionally, blended sample had a lower number of excluded pulls. Increasing levels of post-consumer PET flake, while impacting color, did not have a significant impact on tenacity and elongation, particularly for the blended samples, and blending the flakes resulted in lower variability in molecular composition.

The average elongation standard deviation of yarn formed from unblended curbside flakes supplied by the first supplier (Trials 1-4) was 11.42, and the average tenacity standard deviation of this yarn was 0.777. The average elongation standard deviation of yarn formed from unblended curbside Supplier 1) and heatset, as is commonly known in the arts, and compared to a sample of twisted yarn containing 0% post-consumer PET. The result of this comparison is tabulated in Tables 4 and 5.

As can be appreciated by one of skill in the art, and as illustrated in Table 4, there were differences in color between the samples with blended samples (trial numbers 8-12) having less average variation in b* (blue/yellow) and Db* (blue/yellow) on heatset samples from the beginning and the end of the heatset operation, as measured by a HunterLabs Spectrophotometer. Also, the average b* and Db* values for the blended samples were between the unblended C1 and C2 samples. The positive impact of blending is shown in both reduced variation in color for the samples from the beginning and end of each run and averaging out the color of the different flake providers.

The average b* value of yarn formed from unblended curbside flakes supplied by the first supplier (Trials 1-4) was 3.31, and the average Db* value of this yarn was 1.95. The average b* value of yarn formed from unblended curbside flakes supplied by the second supplier (Trials 5-8) was 2.43, and the average Db* value of this yarn was 1.06. The average b* value of yarn formed from curbside flakes supplied by the first supplier and the second supplier and blended together (Trials 9-12) was 3.16, and the average Db* value of yarn formed from these flakes was 1.79.

There was an average b* difference of 0.36 and an average Db* difference of 0.47 for yarn from unblended curbside flakes supplied by the first and second supplier (Trials 1-8). This average b* difference was reduced to 0.22 and the average Db* difference was reduced to 0.38 when the yarn was formed from curbside flakes supplied by the first supplier and the second supplier and blended together (Trials 9-12). The reduction in variation in color for the samples from the beginning and end of each sample, and the averaging of the contaminants and copolymer content of the different flake providers makes the yarn less variable over time with changes in sources.

TABLE 4

% Post-consumer PET Curbside Flake Heatset Yarn Color

| Trial # | Position | b* | Avg b* | Diff. b* begin and end | Db* | Avg Db* | Diff. Db* begin and end |
|---|---|---|---|---|---|---|---|
| 1 | Begin HS | 1.69 | | | 0.16 | | |
| 1 | End HS | 2.00 | 1.85 | 0.31 | 0.80 | 0.48 | 0.64 |
| 2 | Begin HS | 2.22 | | | 0.68 | | |
| 2 | End HS | 2.64 | 2.43 | 0.42 | 1.44 | 1.06 | 0.76 |
| 3 | Begin HS | 4.43 | | | 2.89 | | |
| 3 | End HS | 4.08 | 4.26 | 0.35 | 2.88 | 2.89 | 0.01 |
| 4 | Begin HS | 4.36 | | | 2.83 | | |
| 5 | End HS | 5.09 | 4.73 | 0.73 | 3.89 | 3.36 | 1.06 |
| 5 | Begin HS | 1.87 | | | 0.33 | | |
| 5 | End HS | 1.82 | 1.85 | 0.05 | 0.61 | 0.47 | 0.28 |
| 6 | Begin HS | 1.44 | | | −0.10 | | |
| 6 | End HS | 1.34 | 1.39 | 0.10 | 0.13 | 0.02 | 0.23 |
| 7 | Begin HS | 3.07 | | | 1.54 | | |
| 7 | End HS | 2.23 | 2.65 | 0.84 | 1.03 | 1.29 | 0.51 |
| 8 | Begin HS | 3.85 | | | 2.32 | | |
| 8 | End HS | 3.79 | 3.82 | 0.06 | 2.59 | 2.46 | 0.27 |
| 9 | Begin HS | 2.13 | | | 0.59 | | |
| 9 | End HS | 2.28 | 2.21 | 0.15 | 1.07 | 0.83 | 0.48 |
| 10 | Begin HS | 2.66 | | | 1.12 | | |
| 10 | End HS | 3.04 | 2.85 | 0.38 | 1.83 | 1.48 | 0.71 |
| 11 | Begin HS | 3.98 | | | 2.45 | | |
| 11 | End HS | 3.90 | 3.94 | 0.08 | 2.70 | 2.58 | 0.25 |
| 12 | Begin HS | 3.78 | | | 2.24 | | |
| 12 | End HS | 3.51 | 3.65 | 0.27 | 2.31 | 2.28 | 0.07 |
| Control | | | | 0.00 | | | 0.00 |

Table 5 illustrates the average tenacity and elongation of the heatset yarns. As can be seen, the yarns formed from a blended post-consumer PET curbside flake had improved tenacity and elongation when compared to similar unblended yards. As can be appreciated by one of skill in the arts, the average tenacity and elongation for all the samples was only marginally lower that the control and has no impact on the carpet formed therefrom.

TABLE 5

Post-consumer PET Curbside Flake Heatset Yarn Tenacity and Elongation

| Trial # | Avg HS Tenacity | Avg HS Elongation |
|---|---|---|
| 1 | 2.483 | 48.888 |
| 2 | 2.544 | 44.015 |
| 3 | 2.535 | 51.351 |
| 4 | 2.455 | 44.307 |
| 5 | 2.572 | 44.087 |
| 6 | 2.520 | 46.110 |
| 7 | 2.461 | 50.394 |
| 8 | 2.444 | 49.361 |
| 9 | 2.600 | 48.291 |
| 10 | 2.545 | 51.828 |
| 11 | 2.537 | 53.664 |
| 12 | 2.516 | 48.999 |
| Control | 2.623 | 56.249 |

The yarn produced from the trials was tufted into carpets and compared to a sample of carpet containing 0% post-consumer PET. For example, carpet Trial 1 was produced only from yarn formed from 50% post-consumer PET curbside flake that was not blended to homogeneity. Carpet Trial 12 was produced only from yarn formed from 100% post-consumer PET curbside flake provided by two suppliers blended together. Each carpet was tested against a control having 0% post-consumer curbside flakes. Tables 6-8 tabulate the results.

Table 6 illustrates that there were no significant differences between the blended samples, the unblended samples, and the control with respect to stain resistant. In each test, various industry-standard staining agents, such as mustard, coffee, red wine, red #40, povidone-iodine were applied to the samples. A score of between 1 and 10 was given to each sample to indicate the carpets resistance to the staining agents.

TABLE 6

Post-consumer PET Curbside Flake Carpet Test Data

| Trial # | Red 40 | Mustard | Povidone-iodine | Coffee | Red Wine |
|---|---|---|---|---|---|
| 1 | 10.0 | 10.0 | 9.0 | 10.0 | 10.0 |
| 2 | 10.0 | 10.0 | 10.0 | 10.0 | 10.0 |
| 3 | 10.0 | 10.0 | 10.0 | 10.0 | 10.0 |
| 4 | 10.0 | 10.0 | 9.0 | 10.0 | 10.0 |
| 5 | 10.0 | 10.0 | 10.0 | 10.0 | 10.0 |
| 6 | 10.0 | 10.0 | 9.0 | 10.0 | 10.0 |
| 7 | 10.0 | 10.0 | 9.0 | 10.0 | 10.0 |
| 8 | 10.0 | 10.0 | 9.0 | 10.0 | 10.0 |
| 9 | 10.0 | 10.0 | 9.0 | 10.0 | 10.0 |
| 10 | 10.0 | 10.0 | 9.0 | 10.0 | 10.0 |
| 11 | 10.0 | 10.0 | 9.0 | 10.0 | 10.0 |
| 12 | 10.0 | 10.0 | 8.0 | 10.0 | 10.0 |
| Control | 10.0 | 10.0 | 9.0 | 10.0 | 10.0 |

As indicated in Table 7, the carpets were evaluated under a variety of conventional industry tests. Xenon, Ozone, Crock and NOx are conventional color-related tests, as measured on a scale of 1 to 5, with 5 being no visible change from control, and 3 being a passing grade. DE (CMC) and Grey Scale are conventional measures of a carpet's resistance to soiling. Hexapod is a conventional measure of the wearability of the carpet, while Pill test is a conventional measure of flammability. As can be seen in Table 7, there were there were no significant differences between the blended samples, the unblended samples, and the control with respect to these tests.

Stitches, Pile Height and Pile Weight and are conventional industry measurements of the construction of a carpet. As illustrated in Table 8, there were no significant differences between the blended samples, the unblended samples, and the control with respect to the construction of the carpets. Streaks, Tips, Hand, and Finish are conventional industry measurements of the appearance of a carpet. While all samples of carpet containing post-consumer PET rated lower for streaking than the control, carpets formed from blended samples had less streaking than that formed from unblended samples. In general, carpets containing post-consumer PET had better hand, less texture and were more dull as the percentage of PET increased. However, based upon improvements in the homogeneity of yarn color as extruded and improved yarn streak ratings, the overall process and system components were shown to be effective.

TABLE 7

Post-consumer PET Curbside Flake Carpet Test Data

| | Accelerated Soiling | | | | 40 hour | Crock* | | 2 cycle | 2 Cycle | 4K Hexapod Perform* | | | Pill |
| | DE(CMC) | | Grey Scale | | | | | | | | | | |
| Trial | Soiled | Cleaned | Soiled* | Cleaned* | Xenon* | Wet | Dry | Ozone* | Nox* | Warp | Fill | Aver | Test |
|---|---|---|---|---|---|---|---|---|---|---|---|---|---|
| 1 | 1.89 | 0.78 | 3.5 | 4.0 | 4.0 | 5.0 | 4.5 | 3.5 | 3.5 | 3.3 | 3.0 | 3.2 | 8/8 |
| 2 | 1.81 | 0.88 | 3.0 | 4.0 | 4.0 | 5.0 | 4.5 | 3.5 | 3.5 | 3.3 | 2.8 | 3.1 | 8/8 |
| 3 | 1.92 | 1.06 | 3.0 | 4.0 | 4.0 | 5.0 | 4.5 | 3.0 | 3.5 | 3.5 | 3.0 | 3.3 | 8/8 |
| 4 | 1.73 | 1.12 | 3.5 | 4.5 | 4.0 | 5.0 | 4.5 | 3.5 | 4.0 | 3.3 | 2.8 | 3.1 | 8/8 |
| 5 | 2.14 | 0.97 | 3.5 | 4.5 | 4.5 | 5.0 | 4.5 | 3.5 | 3.5 | 2.8 | 2.8 | 2.8 | 8/8 |
| 6 | 2.21 | 0.85 | 3.5 | 4.5 | 4.0 | 5.0 | 4.5 | 3.5 | 4.0 | 3.3 | 3.0 | 3.2 | 8/8 |
| 7 | 2.03 | 0.78 | 3.0 | 4.0 | 4.0 | 5.0 | 4.5 | 3.5 | 3.5 | 3.3 | 2.8 | 3.1 | 8/8 |
| 8 | 1.84 | 0.98 | 3.0 | 4.0 | 4.0 | 5.0 | 4.5 | 3.5 | 3.5 | 3.0 | 2.8 | 2.9 | 8/8 |
| 9 | 1.92 | 1.51 | 3.0 | 4.0 | 3.5 | 5.0 | 4.5 | 3.5 | 4.0 | 3.0 | 3.0 | 3.0 | 8/8 |
| 10 | 1.56 | 0.99 | 3.0 | 4.0 | 4.0 | 5.0 | 4.5 | 4.0 | 4.0 | 3.0 | 3.4 | 3.2 | 8/8 |
| 11 | 1.74 | 0.84 | 3.0 | 4.0 | 4.0 | 5.0 | 4.5 | 4.0 | 4.0 | 3.0 | 3.0 | 3.0 | 8/8 |
| 12 | 2.32 | 1.28 | 3.0 | 4.0 | 4.0 | 5.0 | 4.5 | 4.0 | 4.5 | 3.0 | 2.8 | 2.9 | 8/8 |
| Control | 1.90 | 0.80 | 3.0 | 4.0 | 4.0 | 5.0 | 4.5 | 3.5 | 4.0 | 3.3 | 3.0 | 3.2 | 8/8 |

TABLE 8

Post-consumer PET Curbside Flake Carpet Construction and Finish Data

| Trial # | Streak into Pile | Avg Streak | Hand | Avg Hand | Tips | Avg Tips | Finish | Avg Finish | Pile Height (inch) | Stitch | Pile Wgt (oz) |
|---|---|---|---|---|---|---|---|---|---|---|---|
| 1 | 5.50 | | 6.42 | | 6.33 | | 6.00 | | 31/32 | 63 | 43.61 |
| 2 | 6.50 | | 6.17 | | 6.17 | | 5.75 | | 31/32 | 62.5 | 43.60 |
| 3 | 6.50 | | 6.08 | | 6.17 | | 5.75 | | 31/32 | 62.5 | 43.85 |
| 4 | 5.50 | 6.00 | 6.08 | 6.19 | 6.08 | 6.19 | 5.50 | 5.75 | 31/32 | 61 | 43.82 |
| 5 | 6.00 | | 6.58 | | 6.50 | | 6.33 | | 31/32 | 62.5 | 43.86 |
| 6 | 6.50 | | 6.25 | | 6.42 | | 6.17 | | 31/32 | 63 | 43.90 |
| 7 | 6.00 | | 6.17 | | 6.00 | | 5.50 | | 31/32 | 62 | 43.70 |
| 8 | 5.50 | 6.00 | 6.08 | 6.27 | 5.83 | 6.19 | 5.50 | 5.88 | 31/32 | 63 | 43.63 |
| 9 | 6.50 | | 6.58 | | 6.50 | | 6.42 | | 31/32 | 62 | 43.76 |
| 10 | 6.50 | | 6.08 | | 6.17 | | 5.92 | | 31/32 | 64 | 43.78 |
| 11 | 6.50 | | 5.83 | | 6.17 | | 6.00 | | 31/32 | 63 | 43.87 |
| 12 | 6.00 | 6.38 | 5.92 | 6.10 | 5.75 | 6.15 | 5.67 | 6.00 | 31/32 | 63.5 | 43.70 |
| Control | 7.00 | | 7.00 | | 7.00 | | 7.00 | | 31/32 | 62 | 43.95 |

In other experiments, fiber containing 25% post-consumer PET was formed as described above from curbside flakes. The flake lot was pre-blended and pre-crystallized, and dried on a fiber line. The trial processed successfully with no significant differences in runability or product physicals except for a shift in color (approximately 1.5 units yellow). The results of the experiment are, as compared to a control lot containing 0% post-consumer PET is illustrated in Tables 9 and 10. Color was stable throughout the 25% post-consumer PET curbside flake lot.

TABLE 9

Post-consumer PET Curbside Flake Yarn Data

| Lot | Denier | Tenacity | Elongation | NPM | Bulk | FOY |
|---|---|---|---|---|---|---|
| 0% Post-Consumer PET | 1255 | 2.20 | 41.26 | 24.69 | 9.7 | 1.29 |
| 25% Post-Consumer Curbside Flake PET | 1258 | 2.23 | 44.56 | | | 1.14 |

TABLE 10

Post-consumer PET Curbside Flake Color Data

| Lot | DL | Da | Db | DE |
|---|---|---|---|---|
| 0% Post-Consumer PET | .0133 | .035 | −.23 | .3267 |
| 25% Post-Consumer Curbside Flake PET | −.5325 | −.310 | 1.5425 | 2.2313 |

The 25% post-consumer PET curbside flake lot processed with little to no variation in physical properties when compared to the standard except for color, as noted above. The curbside flake lot, as expected by a person of skill in the art, required increased backflushing of the filtering means because of the additional contaminants present in the curbside grade material. In this experiment, the initial pressure across the filtering means with new (clean) screens in place was 175 bar. The backflush pressure was set to 185 bar. With this setting, the curbside flakes backflushed approximately every two hours.

2. Discussion of Results

As can be seen in the above Tables reflecting the testing performed on yarn and carpet from fiber formed from post-consumer PET Curbside Flakes, in general, post-consumer PET flakes blended together performed more like the control than did non-blended flakes. Additionally, post-consumer PET flakes blended from multiple sources performed more like the control than did non-blended flakes.

It is contemplated that the blending of post-consumer PET flakes lowers the percentage of any one impurity in a given sample of the post-consumer PET flakes. For example, if a first lot of post-consumer PET flakes from a supplier has light blue contamination, yet is still within the specifications, another lot of post-consumer PET flakes from a second supplier is not likely to have the same level of light blue contamination, and the blended product will have some level of light blue contamination in between the two lots. Thus, the blended product will have an improved level of light blue contamination when compared to the first lot.

In one aspect, it is contemplated that if the suppliers of post-consumer PET flakes are separated by a geographic distance, then the suppliers are more likely to have different contaminants and copolymer content in the flakes based upon the source of bottles and their respective bottle cleaning technologies. Also, producers of virgin PET resin used to make bottles have their own specific PET formulations. In this aspect, after blending flakes from geographically separated suppliers, any contaminants and copolymer differences present would be present in a more uniform and/or smaller percentage than in an unblended lot from a single supplier.

In another aspect, having contaminants present in a more uniform and/or smaller percentage will yield a more consistent fiber. This fiber can, in turn, be used to produce more consistent goods therefrom, such as for example and without limitation, carpet.

Thus, in one aspect, the invention relates to a polymer mixture comprising polyethylene terephthalate present as up to about 100% homogeneous curbside post-consumer polyethylene terephthalate by weight and balance virgin polyethylene terephthalate, wherein the curbside post-consumer polyethylene terephthalate materials is provided by two or more suppliers.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fiber extruded from polyethylene terephthalate, present in an amount of at least about 5% up to about 100% of homogeneously blended curbside post-consumer polyethylene terephthalate by weight and balance virgin polyethylene terephthalate, wherein the homogeneously blended curbside post-consumer polyethylene terephthalate comprises at least one impurity not present in virgin polyethylene terephthalate; and wherein the at least one impurity comprises floatable contamination in an amount less than 25 ppm, PVC contamination in an amount less than 150 ppm, or a combination thereof.

2. The fiber of claim 1, wherein the polyethylene terephthalate is present as at least about 10% homogeneously blended curbside post-consumer polyethylene terephthalate by weight.

3. The fiber of claim 1, wherein the polyethylene terephthalate is present as at least about 25% homogeneously blended curbside post-consumer polyethylene terephthalate by weight.

4. The fiber of claim 1, wherein the polyethylene terephthalate is present as at least about 50% homogeneously blended curbside post-consumer polyethylene terephthalate by weight.

5. The fiber of claim 1, wherein the at least one impurity present in the homogeneously blended curbside post-consumer polyethylene terephthalate comprises floatable contamination present in an amount less than 25 ppm and PVC contamination present in an amount less than 150 ppm.

6. A Bulked Continuous Filament extruded fiber comprising a polymer composition, of polyethylene present in an amount of at least about 5% up to about 100% of homogeneously blended curbside post-consumer polyethylene terephthalate by weight and balance virgin polyethylene terephthalate, wherein the homogeneously blended curbside post-consumer polyethylene terephthalate comprises at least one impurity not present in virgin polyethylene terephthalate; and wherein the at least one impurity comprises floatable contamination in an amount less than 25 ppm, PVC contamination in an amount less than 150 ppm, or a combination thereof.

7. The fiber of claim 6, wherein the polyethylene terephthalate is present as at least about 10% homogeneously blended curbside post-consumer polyethylene terephthalate by weight.

8. The fiber of claim 6, wherein the polyethylene terephthalate is present as at least about 25% homogeneously blended curbside post-consumer polyethylene terephthalate by weight.

9. The fiber of claim 6, wherein the polyethylene terephthalate is present as at least about 50% homogeneously blended curbside post-consumer polyethylene terephthalate by weight.

10. The fiber of claim 6, wherein the at least one impurity present in the homogeneously blended curbside post-consumer polyethylene terephthalate comprises floatable contamination present in an amount less than 25 ppm and PVC contamination present in an amount less than 150 ppm.

11. A yarn made from the fiber of claim 1.

12. The yarn of claim 11, exhibiting an average tenacity that is no more than 7% lower than an average tenacity measured for a yarn made from a fiber extruded from virgin polyethylene terephthalate.

13. The yarn of claim 11, exhibiting an average elongation that is no more than 5% higher than an average elongation measured for a yarn made from a fiber extruded from virgin polyethylene terephthalate.

14. The yarn of claim 11, exhibiting an average heatset tenacity that is no more than 3% lower than an average heatset tenacity measured for a yarn made from a fiber extruded from virgin polyethylene terephthalate.

15. The yarn of claim 11, exhibiting an average heatset elongation that is no more than 10% lower than a yarn made from a fiber extruded from virgin polyethylene terephthalate.

16. A yarn made from the Bulked Continuous Filament extruded fiber of claim 6.

17. The yarn of claim 16, exhibiting an average tenacity that is no more than 7% lower than an average tenacity measured for a yarn made from a fiber extruded from virgin polyethylene terephthalate.

18. The yarn of claim 16, exhibiting an average elongation that is no more than 5% higher than an average elongation measured for a yarn made from a fiber extruded from virgin polyethylene terephthalate.

19. The yarn of claim 16, exhibiting an average heatset tenacity that is no more than 3% lower than an average heatset tenacity measured for a yarn made from a fiber extruded from virgin polyethylene terephthalate.

20. The yarn of claim 16, exhibiting an average heatset elongation that is no more than 10% lower than an average heatset elongation measured for a yarn made from a fiber extruded from virgin polyethylene terephthalate.

* * * * *